US011845427B2

(12) United States Patent
Son et al.

(10) Patent No.: US 11,845,427 B2
(45) Date of Patent: Dec. 19, 2023

(54) HYBRID VEHICLE AND STABILITY CONTROL METHOD FOR THE SAME

(71) Applicants: HYUNDAI MOTOR COMPANY, Seoul (KR); KIA MOTORS CORPORATION, Seoul (KR)

(72) Inventors: Hui Un Son, Suwon-si (KR); Jea Mun Lee, Seoul (KR); Sung Bae Jeon, Ansan-si (KR); Ji Hoon Kang, Seoul (KR); Jin Kyeom Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 722 days.

(21) Appl. No.: 16/919,621

(22) Filed: Jul. 2, 2020

(65) Prior Publication Data
US 2021/0039634 A1 Feb. 11, 2021

(30) Foreign Application Priority Data
Aug. 6, 2019 (KR) .................. 10-2019-0095567

(51) Int. Cl.
*B60W 30/09* (2012.01)
*B60W 10/188* (2012.01)
(Continued)

(52) U.S. Cl.
CPC ............ *B60W 30/09* (2013.01); *B60W 10/18* (2013.01); *B60W 10/188* (2013.01);
(Continued)

(58) Field of Classification Search
CPC ...... B60R 21/013; B60W 10/08; B60W 10/18; B60W 10/188; B60W 10/20; B60W 30/02;
(Continued)

(56) References Cited

U.S. PATENT DOCUMENTS

2011/0264347 A1*  10/2011  Cetinkaya ................ B60T 7/22
                                                        701/70
2014/0316668 A1*  10/2014  Akiyama .............. B60W 10/20
                                                        701/70
2015/0019063 A1*  1/2015  Lu .......................... B60W 40/04
                                                        701/25

(Continued)

FOREIGN PATENT DOCUMENTS

JP      2016060361 A  *  4/2016
JP      2019051873 A  *  4/2019
(Continued)

OTHER PUBLICATIONS

English translation of JP-2019051873-A (Year: 2019).*
English translation of JP-2016060361-A (Year: 2016).*

*Primary Examiner* — Anshul Sood
(74) *Attorney, Agent, or Firm* — Morgan, Lewis & Bockius LLP

(57) ABSTRACT

A stability control method of a vehicle includes: determining possibility of broadside collision; as a result of the determining, when the possibility of broadside collision is present, applying a standby hydraulic pressure to a hydraulic brake device; when broadside collision is detected, performing evasion steering using the hydraulic brake device in consideration of a direction of the broadside collision; and performing stability control after the evasion steering is performed.

15 Claims, 6 Drawing Sheets

(51) Int. Cl.
  *B60W 10/20* (2006.01)
  *B60W 30/02* (2012.01)
  *B60W 10/18* (2012.01)
  *B60W 30/085* (2012.01)
  *B60W 30/095* (2012.01)

(52) U.S. Cl.
  CPC ............ *B60W 10/20* (2013.01); *B60W 30/02* (2013.01); *B60W 30/085* (2013.01); *B60W 30/0956* (2013.01); *B60W 2520/10* (2013.01); *B60W 2520/14* (2013.01); *B60W 2552/50* (2020.02); *B60W 2554/20* (2020.02); *B60W 2554/801* (2020.02)

(58) Field of Classification Search
  CPC . B60W 30/085; B60W 30/09; B60W 30/0956
  See application file for complete search history.

(56) References Cited

U.S. PATENT DOCUMENTS

| | | | |
|---|---|---|---|
| 2015/0360655 A1* | 12/2015 | Odate | B60W 10/18 701/70 |
| 2016/0280266 A1* | 9/2016 | Kawamata | B60W 10/184 |
| 2017/0072949 A1* | 3/2017 | Vollmer | B60W 10/20 |
| 2017/0210382 A1* | 7/2017 | Nishimura | G08G 1/16 |
| 2019/0375402 A1* | 12/2019 | Shimizu | B60W 10/18 |

FOREIGN PATENT DOCUMENTS

| | | |
|---|---|---|
| KR | 0130315 A | 12/1998 |
| KR | 10-2006-0000154 A | 1/2006 |
| KR | 10-2008-0054006 A | 6/2008 |
| KR | 10-2014-0036818 A | 3/2014 |
| KR | 10-2015-0018010 A | 2/2015 |

* cited by examiner

-PRIOR ART-

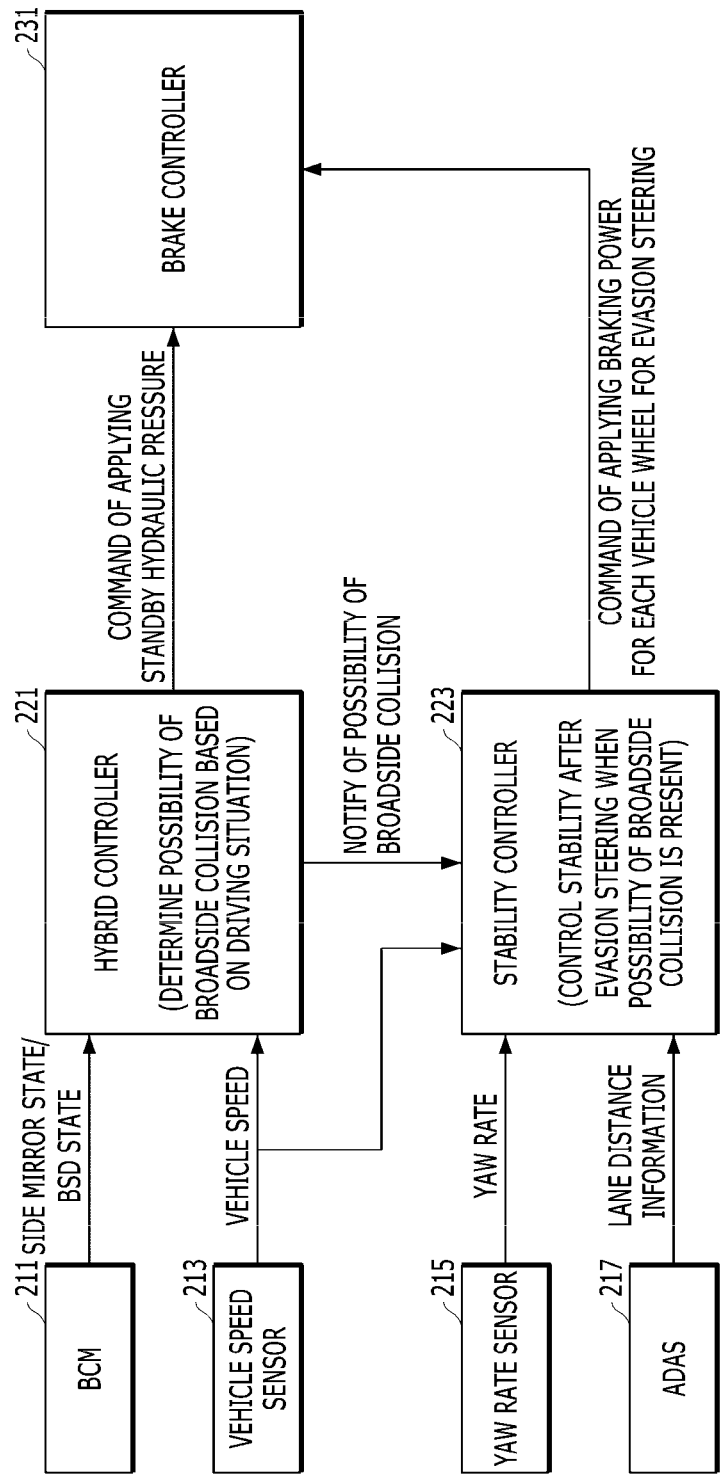

HYBRID VEHICLE AND STABILITY CONTROL METHOD FOR THE SAME

CROSS-REFERENCE TO RELATED APPLICATION

This application claims the benefit of priority to Korean Patent Application No. 10-2019-0095567, filed on Aug. 6, 2019 in the Korean Intellectual Property Office, the entire disclosure of which is incorporated herein by reference.

TECHNICAL FIELD

The present disclosure relates to a hybrid vehicle and a stability control method for the same for enhancing safety when broadside collision is predicted or occurs.

BACKGROUND

In general, a hybrid electric vehicle (HEV) refers to a vehicle that uses two power sources that mainly include an engine and an electric motor. An HEV has excellent fuel efficiency and engine performance compared with a vehicle including only an internal combustion engine and is also advantageous for lowering emissions, and thus, has been actively developed recently.

A configuration of a hybrid vehicle will be described. FIG. 1 is a diagram illustrating an example of a configuration of a powertrain of a general parallel type hybrid vehicle.

FIG. 1 shows a powertrain of a hybrid vehicle employing a parallel type hybrid system including an electric motor 140 (or a driving motor) and an engine clutch 130 that are installed between an internal combustion engine (ICE) 110 and a transmission 150.

In such a vehicle, in general, when a driver presses an accelerator after turning on the vehicle, the motor 140 is driven using power of a battery while the engine clutch 130 is open and transmits power to move wheels through the transmission 150 and a final drive (FD) 160 (i.e., EV mode). As the vehicle gradually accelerates, high traction force is further required and, in this case, an auxiliary motor (or a starter generator motor 120) may be operated to drive the engine 110.

Accordingly, when rotational speeds of the engine 110 and the motor 140 are equal to each other, the engine clutch 130 is then engaged such that both the engine 110 and the motor 140 drive the vehicle (i.e., transition to an HEV mode from an EV mode). When a predetermined engine off condition such as vehicle deceleration is satisfied, the engine clutch 130 is open and the engine 110 stops (i.e., transition to an EV mode from an HEV mode). In addition, the hybrid vehicle converts traction force of a wheel into electrical energy to recharge a battery, which is referred to as braking energy regeneration or regenerative brake.

The starter generator motor 120 functions as a starter motor when the engine is turned on and functions as a generator after the engine is turned on or when rotational energy is recovered during an engine off condition. Thus, the starter generator motor 120 may also be referred to as a hybrid starter generator (HSG) and as necessary may be referred to as an auxiliary motor.

However, in the aforementioned hybrid vehicle, it is possible to rapidly apply braking power through regenerative brake by torque control of the motor 140, but it is not possible to independently control torque of regenerative brake for each vehicle wheel. In other words, one driving motor 140 is connected to two driving wheels by a differential device, and thus, it is not possible to independently control torque for each vehicle wheel as long as respective vehicle wheels do not include separate driving motors, respectively. Thus, a stability control function is not expected in an urgent situation such as broadside collision through regenerative brake alone.

In hydraulic brake, braking power is generated by compressing a brake pad attached to a caliper to cause friction using a hydraulic pressure on opposite surfaces of a disk that is rotated together with a wheel. It is possible to independently control braking power by four wheels using four solenoid valves of an anti-lock braking system (ABS) device in one booster and master cylinder. In general, a gap is formed between a brake pad and a disk to remove friction during driving. In this case, when the gap is increased, it is possible to completely remove friction between the disk and the pad, but a delay phenomenon occurs until actual braking power is achieved by applying a hydraulic pressure to cause friction between the disk and the pad. In contrast, when the gap is reduced, it is possible to rapidly ensure braking power, but fuel efficiency is reduced while the disk and the pad contact each other. In the hybrid vehicle, it is possible to immediately apply brake torque through regenerative brake, and thus, the gap tends to be increased to increase fuel efficiency.

In other words, in the case of a hydraulic brake, it is possible to independently control braking power for each vehicle wheel through an ABS module, but when a standby hydraulic pressure is not applied to enhance fuel efficiency, a delay phenomenon of generating braking power occurs. The delay phenomenon is very short, but a car accident also occurs due to a difference of one several thousandth seconds, and thus, it is very important to reduce the difference.

Accordingly, in order to immediately perform a stability control function in a situation of broadside collision, it is ideal that a standby hydraulic pressure is pre-applied in a situation in which broadside collision is predicted. However, there is a limit in that a broadside collision sensor for operating an airbag is operated only in a threshold value or greater and it is not possible to predict collision. An electronic stability control (ESC) device compares steering of a driver with a vehicle behavior and controls vehicle stability, but in the case of broadside collision, it is much safe that evasion steering of broadside collision is performed not in a steering direction and then the stability is controlled in the steering direction.

The information included in this Background section is only for enhancement of understanding of the general background of the present disclosure and may not be taken as an acknowledgement or any form of suggestion that this information forms the prior art already known to a person skilled in the art.

SUMMARY

Accordingly, the present disclosure is directed to a hybrid vehicle and a stability control method for the same for enhancing safety if possible through stability control when collision is predicted or occurs.

In particular, the present disclosure is directed to a hybrid vehicle and a stability control method for the same for enhancing safety if possible through stability control when broadside collision is predicted or occurs.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a stability control method of a vehicle includes determining possibility of broadside collision, as a result of the determining, when the possibility of broadside collision is present, applying a standby hydraulic pressure to a hydraulic brake device, when broadside collision is detected, performing evasion steering using the hydraulic brake device in consideration of a direction of the broadside collision, and performing stability control after the evasion steering is performed.

In another aspect of the present disclosure, a vehicle for stability control includes: a first controller configured to determine possibility of broadside collision, and configured to, as a result of the determining, when the possibility of broadside collision is present, apply a command of applying a standby hydraulic pressure to a hydraulic brake device; and a second controller configured to, when broadside collision is detected after the first controller determines the possibility of broadside collision, to perform stability control after the evasion steering is performed using the hydraulic brake in consideration of a direction of the broadside collision.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 is a diagram showing an example of a configuration of a hybrid vehicle according to an exemplary embodiment of the present disclosure;

DETAILED DESCRIPTION

Figure 1:
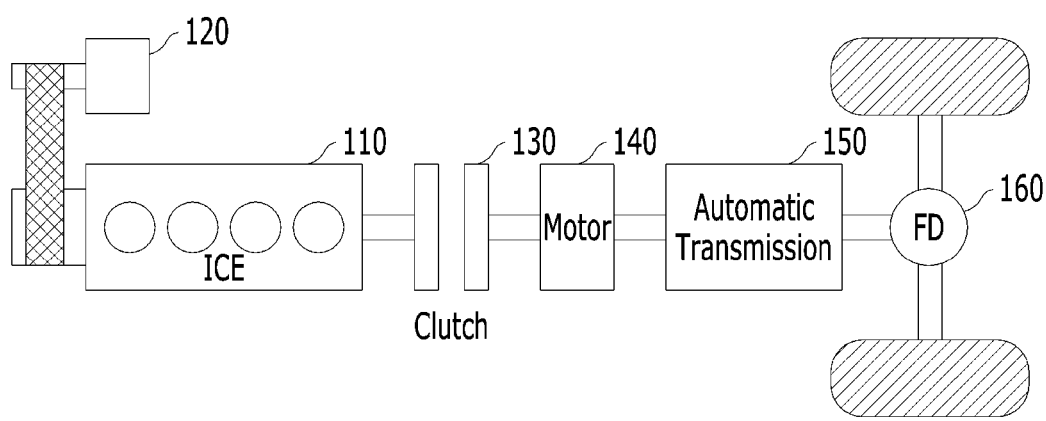
FIG. 1 is a diagram illustrating an example of a configuration of a powertrain of a general parallel type hybrid vehicle.

Hereinafter, exemplary embodiments of the present disclosure will be described in detail with reference to the accompanying drawings so as to be easily implemented by those skilled in the art. However, the present disclosure may be variously implemented and is not limited to the exemplary embodiments described herein. In the drawings, in order to clearly describe the present disclosure, portions which are not related to the description of the present disclosure will be omitted and similar portions are denoted by similar reference numerals throughout the specification.

Throughout the specification, when a certain portion "includes" a certain component, this indicates that the other components are not excluded, but may be further included unless specially described. The same reference numbers will be used throughout the drawings to refer to the same or like parts.

An exemplary embodiment of the present disclosure proposes that safety be enhanced by applying a standby hydraulic pressure of a hydraulic brake device for prior preparation of broadside collision in a situation in which broadside collision is predicted during driving and by performing stability control after evasion steering in consideration of a broadside collision situation when an electronic stability control (ESC) device is operated due to a difference is generated between a requested proceeding direction of a driver and an actual proceeding direction with respect to a vehicle to which a standby hydraulic pressure is not applied to enhance fuel efficiency, such as a hybrid vehicle.

FIG. 2 is a diagram showing an example of a configuration of a hybrid vehicle according to an exemplary embodiment of the present disclosure.

Referring to FIG. 2, the hybrid vehicle according to an exemplary embodiment may broadly include information acquisition units 211, 213, 215, and 217 for acquiring required information required for stability control, control units 221 and 223 for performing determination, decision, and control required for stability control, and an execution unit 231 for performing control determined by the control units 221 and 223.

First, a hybrid controller 221 may determine the possibility that broadside collision occurs based on a state of a vehicle and a surrounding situation in addition to an overall driving control function (e.g., driving mode switch or scheduling depending on a driving load or a battery state) of a general hybrid vehicle, may transfer a command of applying a standby hydraulic pressure for evasion steering after collision, which is described below, to a brake controller 231 when the possibility of broadside collision is present, and may notify a stability controller 223 about the possibility of broadside collision.

To this end, the hybrid controller 221 may acquire information on a vehicle surrounding situation from a body control module (BCM) 211 and may acquire vehicle speed information from a vehicle speed sensor 213. For example, the BCM 211 may acquire information on whether a side mirror is folded and may acquire information on whether an object that approaches a vehicle is present from a blind spot detection (BSD) device.

The information on whether the side mirror is folded may be considered to predict broadside collision for the following reasons. A part that protrudes to a highest degree from a lateral side of a vehicle is a side mirror. Thus, when the side mirror contacts another vehicle or the like and is folded before broadside collision with the vehicle occurs, the possibility that broadside collision with the vehicle occurs is very high, and therefore, this may cause a prediction of broadside collision. Even if the side mirror is folded, when a surrounding vehicle is not detected from BSD information, the hybrid controller 221 may determine that the possibility of collision is not present.

The hybrid controller 221 may consider a current driving situation when determining the possibility of broadside collision based on a side mirror folding state and BSD information. For example, this is because a driver arbitrarily folds the side mirror in a situation in which a vehicle is stopped and is parked but not in a driving situation and an obstacle such as another vehicle or a wall is always detected around the vehicle. Thus, a condition for enabling determination of whether broadside collision occurs may be preset. For example, a state in which a vehicle is turned on (IG On or EV/HEV ready), a state in which a transmission is R/N/D, and a state in which a parking assistance function (SPAS or the like) is not operated may correspond to the condition. When the condition is set, the stability control according to the present embodiment may not be unnecessarily performed in a case in which the side mirror is folded and an SPAS function is operated in order to park a vehicle in a narrow space or a transmission is positioned in stage P and the side mirror is folded in order to use a mechanical parking station.

Then, in addition to an ESC function based on a general yaw rate, the stability controller 223 may determine that collision occurs and may control a stability control procedure after evasion steering when a desired proceeding direction of a driver and an actual proceeding direction of the vehicle are not matched with each other in a situation in which the hybrid controller 221 indicates that the possibility of broadside collision is present. Here, the evasion steering may mean that a vehicle moves adjacent to a lane (when a medium barrier or a guard rail is detected, this may be replaced with the medium barrier or the guard rail) positioned at an opposite side to a collision side such evasion steering may begin by applying hydraulic braking power to a front wheel at an opposite side to the collision side, and the hybrid controller 221 may pre-transfer a command of applying a standby hydraulic pressure to the brake controller 231 at a time point when broadside collision is predicted to occur. Thus, the evasion steering may be immediately performed without delay due to a gap between the disk and the brake pad. A more detailed evasion steering procedure will be described below with reference to FIG. 5, and stability control after evasion steering corresponds to a general stability control (ESC) function, and thus, a detailed description thereof is omitted.

To this end, the stability controller 223 may acquire information on a yaw rate from a yaw rate sensor 215 and may acquire information on a distance between a vehicle and a lane from an advanced driver assistance system (ADAS). For example, the information on the distance between the vehicle and the lane may be acquired through lane information detected by a line keeping assistance system (LKAS) of an ADAS 217, and a scope and form of the evasion steering may also be determined depending on a distance between the vehicle and the closest lane thereto positioned at an opposite side to a collision side.

The brake controller 231 may apply a standby hydraulic pressure and braking power for each vehicle wheel, may apply a standby hydraulic pressure to each vehicle wheel according to a command of applying a vehicle wheel of the hybrid controller 221 as described above, and may apply braking power for each vehicle wheel for evasion steering according to the command of applying braking power of the stability controller 223. The brake controller 231 may be embodied in the form of an integrated brake assist unit (iBAU) but the present disclosure is not limited thereto.

Hereinafter, a concept and a calculation form of a prior action when collision is predicted and evasion steering and stability control after collision occurs will be described based on the aforementioned configuration of a vehicle with reference to FIGS. 3A, 3B, 4A, 4B, 5A, 5B, and 5C.

Figure 3A:
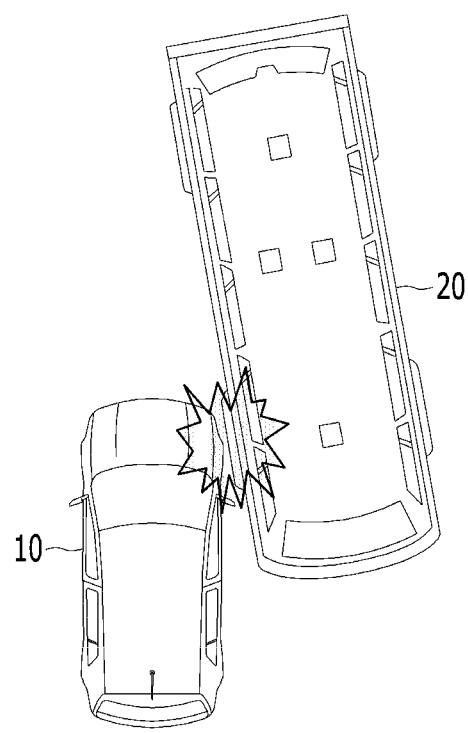
FIGS. 3A and 3B are diagrams for explaining a concept of an operation of a hybrid vehicle when broadside collision is predicted according to an exemplary embodiment of the present disclosure.
Figure 3B:
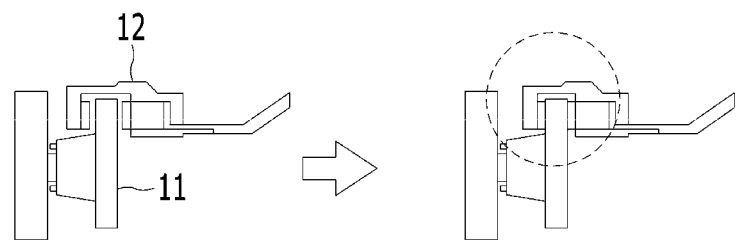

FIGS. 3A and 3B are diagrams for explaining a concept of an operation of a hybrid vehicle when broadside collision is predicted according to an exemplary embodiment of the present disclosure.

First, referring to FIG. 3A, before another vehicle directly collides with a vehicle body of the subject vehicle 10 while approaching a right side of a subject vehicle during driving, a side mirror may be pre-folded. The hybrid controller 221 may detect a surrounding obstacle through BSD, may predict the possibility of broadside collision based on folding of a side mirror, and may transfer a command of applying a standby hydraulic pressure to the brake controller 231.

Thus, as shown in FIG. 3B, the brake controller 231 may apply the standby hydraulic pressure to allow a caliper 12 including a brake pad attached thereto to approach a disk 11.

Figure 4A:
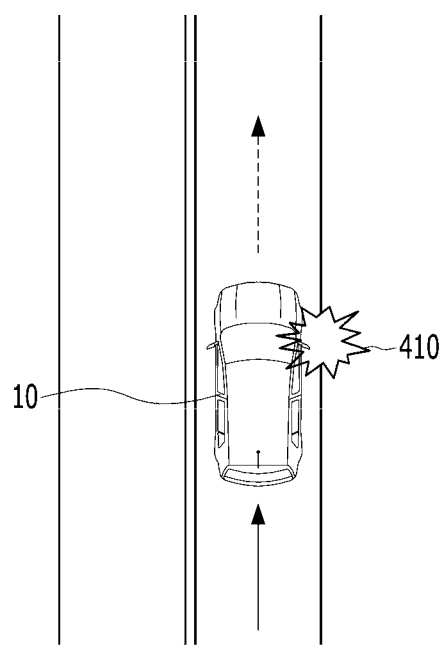
FIGS. 4A and 4B are diagrams for explaining a concept of an operation of a hybrid vehicle when broadside collision occurs according to an exemplary embodiment of the present disclosure.
Figure 4B:
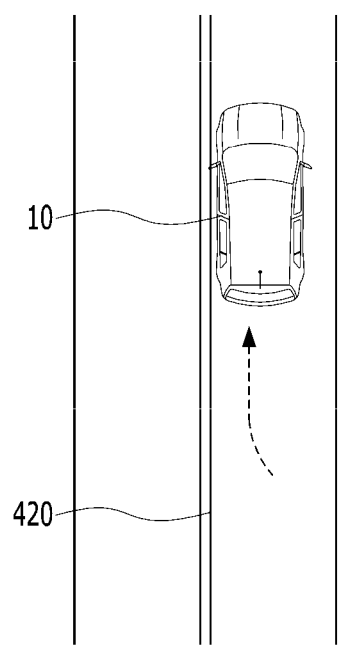

FIGS. 4A and 4B are diagrams for explaining a concept of an operation of a hybrid vehicle when broadside collision occurs according to an exemplary embodiment of the present disclosure. It may be assumed that a situation of FIGS. 4A and 4B are subsequent situations of FIGS. 3A and 3B.

As shown in FIG. 4A, as collision 410 occurs at a right side of the subject vehicle 10, the stability controller 223 may determine a distance between the subject vehicle 10 and the closest lane 420 thereto positioned at an opposite side to the collision 410 as shown in FIG. 4B. The stability controller 223 may perform evasion steering of transferring a brake command to the brake controller 231 and allowing the subject vehicle 10 to approach the corresponding lane 420 to sequentially apply braking power to a front left wheel and a front right wheel based on the determined distance with the lane 420. After evasion steering, the stability controller 223 may perform stability control (ESC) according to whether a yaw rate is abnormal.

Figure 5A:
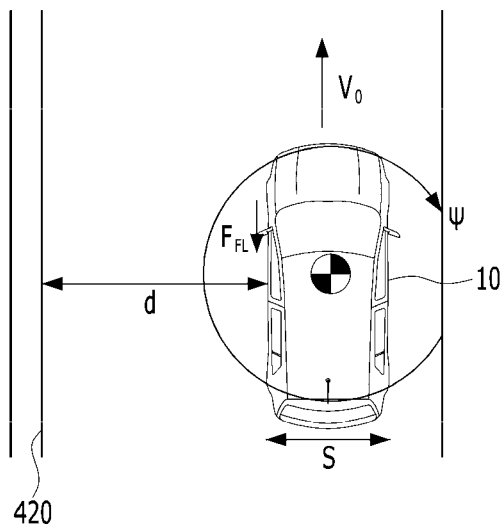
FIGS. 5A, 5B, and 5C are diagrams for explaining a physical law related to evasion steering of a hybrid vehicle when broadside collision occurs according to an exemplary embodiment of the present disclosure.
Figure 5B:
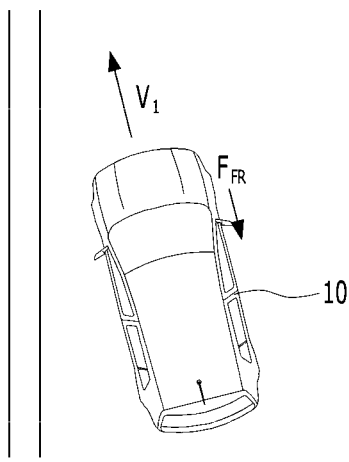
Figure 5C:
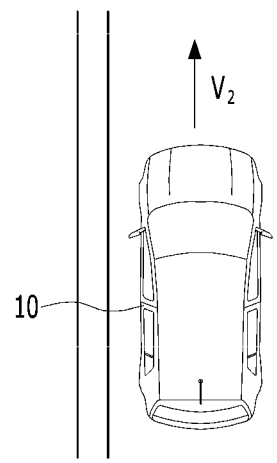

FIGS. 5A, 5B, and 5C are diagrams for explaining a physical law related to evasion steering of a hybrid vehicle when broadside collision occurs according an exemplary embodiment of the present disclosure.

In FIGS. 5A, 5B, and 5C, it is assumed that collision occurs at a right side of the subject vehicle 10. FIG. 5A shows a situation at a time point (i.e., t=0) when collision is detected, FIG. 5B shows a situation at a time point (i.e., t=0 to t1) when braking power is applied to a front left wheel after collision is detected, and FIG. 5C shows a situation at a time point (i.e., t=t1+t2) when braking power is sequentially applied to the front left wheel and the front right wheel.

First, referring to FIG. 5A, collision occurs at the right side at t0, and thus, the stability controller 223 may determine evasion steering toward the left lane 420 and may first determine to apply braking power $F_{FL}$ to the front left wheel of the vehicle during t1. Then, the stability controller 223 may apply braking power $F_{FR}$ to the front right wheel during t2 as shown in FIG. 5B and may control the vehicle 10 in a state in which the vehicle is driven in a forward direction as shown in FIG. 5C.

Hereinafter, a procedure of determining the braking power $F_{FL}/F_{FR}$ and the applying time t1/2 of each vehicle wheel by a stability controller will be described below.

Assumption applied in FIGS. 5A, 5B, and 5C will be described below.

Assumption 1: A time period when a hydraulic pressure is applied and brake torque is applied may be very short compared with a vehicle behavior (dynamics), and thus, may be negligible.

Assumption 2: The brake torque may be constantly applied over time.

Assumption 3: $\Psi$ (yaw) of a vehicle is very small, and thus, $\Psi$ is approximated to sin $\Psi$.

Signs in FIGS. 5A, 5B, and 5C and Equations below have the following meanings.

$I_{vehicle}$ Inertia moment of vehicle

M: Mass of vehicle s: track width of vehicle $F_{FL}/F_{FR}$: left/right braking power of front wheel Ψ: yaw of vehicle d: distance between vehicle and opposite lane to collision with vehicle $V_0$: initial speed of vehicle $t_{1/2}$: time when left/right braking power of front wheel is applied $d_{1/2}$: transverse-direction moving distance of vehicle while left/right braking power of front wheel is applied $V_{1/2}$: vehicle speed while left/right braking power of front wheel is applied $Ψ_{1/2}$: yaw of vehicle while left/right braking power of front wheel is applied First, braking power may be applied to a front left wheel to t1 from t0, and in this situation, a vehicle behavior (dynamics) may comply with Equations below.

$$I_{vehicle} \ddot{\psi}_1 = -\frac{s}{2} F_{FL} \quad \text{[Equation 1]}$$

According to Equation 1 above, a moment of a vehicle may be a value obtained by multiplying inertia moment $I_{vehicle}$ of a vehicle by an angular acceleration $\ddot{\psi}_1$ and may be half of the product of the track width s and the braking power $F_{FL}$ of the front left wheel.

$$\dot{\psi}_1(t) = \int_0^t -\frac{sF_{FL}}{2I_{vehicle}} dt \approx -\frac{sF_{FL}}{2I_{vehicle}} t \quad \text{[Equation 2]}$$

An angular speed $\dot{\psi}_1(t)$ may be a value obtained by organizing Equation 1 above with respect to the angular acceleration $\ddot{\psi}_1$ and then approximating an integral value of a result value, according to Equation 2 above.

$$\psi_1(t) \approx -\frac{sF_{FL}}{4I_{vehicle}} t^2 \quad \text{[Equation 3]}$$

A yaw $\psi_1(t)$ of a vehicle while braking power is applied to a front left wheel may be acquired by re-integrating the angular speed $\dot{\psi}_1(t)$ of Equation 2 above.

$$d_1(t) = \int_0^t v_1(t) \sin\psi_1(t) dt =$$

$$\int_0^t \left(v_0 - \frac{F_{FL}}{M}t\right) \times -\frac{sF_{FL}}{4I_{vehicle}} t^2 dt = \frac{sF_{FL}^2}{16MI_{vehicle}} t^4 - \frac{sF_{FL}v_0}{12I_{vehicle}} t^3 \quad \text{[Equation 4]}$$

A distance $d_1(t)$ between the vehicle 10 and the lane 420 during t1 may be represented as an integral value of a transverse moving component $v_1(t)\sin\psi_1(t)$ of a vehicle speed during a corresponding time according to Equation 4 above.

As a result, a lane-direction moving distance $d_1$, a vehicle speed $v_1$, and a yaw $\psi_1$ during t1 may be summarized according to Equation 5 below.

$$\therefore d_1 = \frac{sF_{FL}^2}{16MI_{vehicle}} t_1^4 - \frac{sF_{FL}v_0}{12I_{vehicle}} t_1^3 \quad \text{[Equation 5]}$$

$$v_1 = v_0 - \frac{F_{FL}}{M} t_1$$

$$\psi_1 = -\frac{sF_{FL}}{4I_{vehicle}} t_1^2$$

Hereinafter, a vehicle behavior (dynamics) of a situation in which braking power is applied to a front right wheel (i.e., t=t1 to t1+t2) will be summarized as follows.

$$\therefore d_2 = \quad \text{[Equation 6]}$$

$$-\frac{sF_{FL}v_1 t_1 t_2^2}{4I_{vehicle}} + \frac{sF_{FL}F_{FR}t_1 t_2^3}{6MI_{vehicle}} - \frac{sF_{FR}^2}{16MI_{vehicle}} t_2^4 + \frac{sF_{FR}v_1}{12I_{vehicle}} t_2^3$$

A distance $d_2$ between the vehicle 10 and the lane 420 during t2 may be a value obtained by subtracting $d_1$ from a moving distance to t2, and thus, may be represented according to Equation 6 above with reference to Equations 4 and 5 above.

$$\psi_2 = -\frac{sF_{FL}}{2I_{vehicle}} t_1 t_2 + \frac{sF_{FR}}{4I_{vehicle}} t_2^2 \quad \text{[Equation 7]}$$

As a result, a yaw $\psi_2$ during t2 may be summarized according to Equation 7 above.

Lastly, a vehicle behavior (dynamics) needs to satisfy a condition of Equation 8 below.

$$d = d_1 + d_2$$

$$\psi = \psi_1 + \psi_2 = 0 \quad \text{[Equation 8]}$$

The stability controller 223 may determine appropriate $F_{FL/FR}$ and $t_{1/2}$ to satisfy Equation 8 above. Such parameters are dependent upon each other, and for example, as braking power is increased, a time may be reduced. Thus, when the stability controller 223 generates braking power that is pre-defined depending on a vehicle speed, a time $t_{1/2}$ for executing braking power may be acquired or the converse is possible.

Figure 6:
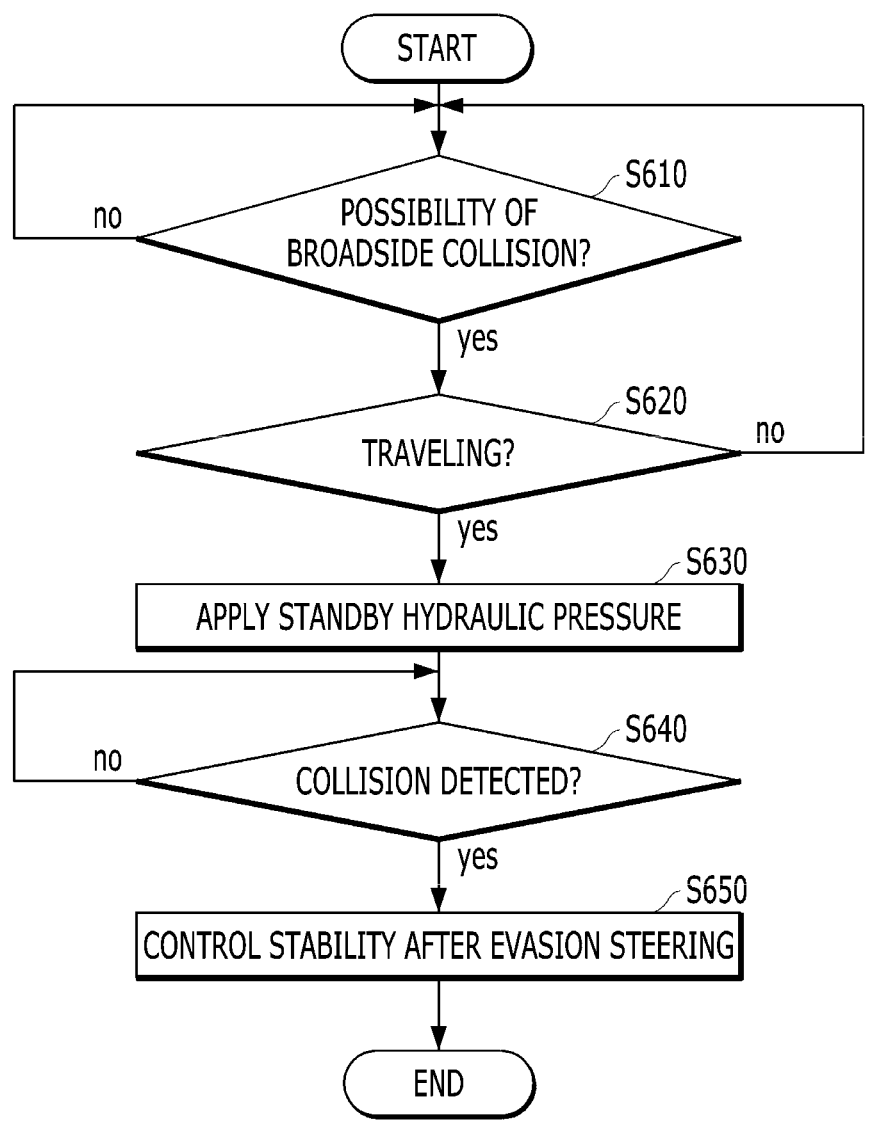
FIG. 6 is a flowchart showing an example of a stability control operation of a hybrid vehicle according to an exemplary embodiment of the present disclosure.

The stability control of the hybrid vehicle described thus far is summarized in a flowchart of FIG. 6.

FIG. 6 is a flowchart showing an example of a stability control operation of a hybrid vehicle according to an exemplary embodiment of the present disclosure. Among operations in FIG. 6, the operations that are described above with reference to FIGS. 2, 3A, 3B, 4A, 4B, 5A, 5B, and 5C are not described for brevity of description.

Referring to FIG. 6, first, the hybrid controller 221 may determine whether the possibility of broadside collision is present (S610).

As the determination result, when the possibility of broadside collision is present, for example, when an obstacle is present around a vehicle or a side mirror is folded, the hybrid controller 221 may determine whether a vehicle travels (S620). Whether the vehicle travels may be determined depending on a state of a transmission, a vehicle speed, whether the vehicle is turned on, or the like. In some embodiments, an order of operations S620 and S610 may be reversed.

When determining that the possibility of broadside collision is present during driving in operations S610 and S620, the hybrid controller 221 may transfer a command of applying a standby hydraulic pressure to the brake controller 231, and thus, the brake controller 231 may apply the standby hydraulic pressure (S630).

As the hybrid controller 221 notifies the stability controller 223 of the fact that the possibility of broadside collision is present, the stability controller 223 may monitor a yaw rate and may detect whether collision occurs (S640), and when collision occurs (S640), the stability controller 223 may control a stability control operation after evasion steering (S650). As described above, evasion steering may be performed to move a vehicle adjacent to a lane positioned at an opposite side to a collision side, a medium barrier, a guard rail, or the like, and with regard to an amplitude and applying time of braking power for each vehicle wheel for evasion steering, the method described above with reference to FIGS. 5A, 5B, and 5C may be applied.

The determination result of the possibility of broadside collision according to the exemplary embodiments described thus far may be applied to application of a standby hydraulic pressure and entry into a collision detection state prior to evasion steering, but according to another embodiment, corresponding information may be referred to by deployment of a side (curtain) airbag. For example, when an airbag controller does not recognize broadside collision due to a failure state of a broadside collision sensor or influence of a collision angle, the determination result of the possibility of broadside collision may be referred to by determination of whether a side (curtain) airbag is deployed as well as whether other airbags are deployed based on a detection result of other sensors.

In addition, when determining that the possibility of broadside collision is present, the hybrid controller 221 may transfer the determination result to an output unit in a vehicle and the stability controller may also notify the output unit in the vehicle of the fact that stability control is performed after evasion steering due to broadside collision. As such, visual guidance/warning may be output on the output unit in the vehicle, for example, a display of a head unit, a head-up display, or a cluster or guidance/warning horn may be output through a speaker.

The exemplary embodiments of the present disclosure may have the following effects.

When a side mirror is folded or a lateral vehicle is detected through BSD with respect to a vehicle in which a standby hydraulic pressure of a hydraulic brake device is not applied in order to enhance fuel efficiency, the standby hydraulic pressure may be applied to enhance the safety in the case of broadside collision of the vehicle while maintaining a level of existing fuel efficiency.

Broadside collision may be limited to a steering direction of a driver and stability control may be performed after evasion steering, thereby enhancing the safety and marketability of the vehicle.

The hybrid vehicle related to at least one embodiment as configured above may achieve as enhanced safety as possible.

In particular, according to exemplary embodiments of the present disclosure, a standby hydraulic pressure may be applied when broadside collision is predicted, and thus, stability control may be immediately performed when collision is detected, and stability control may be performed after evasion steering, thereby enhancing safety after collision.

It will be appreciated by persons skilled in the art that the effects that could be achieved with the present disclosure are not limited to what has been particularly described hereinabove and other advantages of the present disclosure will be more clearly understood from the detailed description.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A stability control method of a vehicle, the method comprising:
   determining possibility of broadside collision;
   as a result of the determining, when the possibility of broadside collision is present, applying a standby hydraulic pressure to a hydraulic brake device;
   when broadside collision is detected, performing evasion steering using the hydraulic brake device in consideration of a direction of the broadside collision and a distance between a vehicle and at least one of a lane, a medium barrier, or a guard rail, and a yaw of the vehicle and the vehicle speed, and determining a size of first braking power to be applied to the first front wheel, a first time at which the first braking power is to be applied, a size of second braking power to be applied to the second front wheel, and a second time at which the second braking power is to be applied; and
   performing stability control after the evasion steering is performed.

2. The method of claim 1, wherein the applying is performed when the vehicle satisfies a preset determination condition during driving.

3. The method of claim 1, wherein the performing evasion steering is performed to approach at least one of a lane, a medium barrier, or a guard rail, adjacent to the vehicle at an opposite side to a side of the broadside collision.

4. The method of claim 1, wherein a predetermined value based on the vehicle speed is applied to the size of the first braking power and the size of the second braking power.

5. The method of claim 1, wherein the determining possibility of broadside collision is performed in consideration of whether an object is present around the vehicle and whether a side mirror is folded.

6. The method of claim 1, wherein the vehicle does not apply the standby hydraulic pressure to the hydraulic brake device at ordinary times and includes a hybrid vehicle including a single driving motor, wherein the ordinary times represent times when possibility of broadside collusion is not detected.

7. The method of claim 1, further comprising outputting information indicating that at least one of the possibility of broadside collision or the evasion steering is performed, through a predetermined output unit.

8. A non-transitory computer readable recording medium having recorded thereon a program for executing the stability control method of the vehicle of claim 1.

9. A vehicle for stability control, the vehicle comprising:
a first controller configured to determine possibility of broadside collision, and configured to, as a result of determination, when the possibility of broadside collision is present, transfer a command of applying a standby hydraulic pressure to a hydraulic brake device; and
a second controller configured to, when the first controller detects broadside collision after determining the possibility of broadside collision, perform stability control after an evasion steering is performed using the hydraulic brake device in consideration of a direction of the broadside collision, a distance between the vehicle and at least one of a lane, a medium barrier, or the guard rail, and a yaw of the vehicle and a vehicle speed and sequentially applies hydraulic braking power to a first front wheel at an opposite side to the side of the broadside collision and a second front wheel at a side corresponding to the broadside collision and determines a size of first braking power to be applied to the first front wheel, a first time at which the first braking power is to be applied, a size of second braking power to be applied to the second front wheel, and a second time at which the second braking power is to be applied.

10. The vehicle of claim 9, wherein the first controller transfers the command of applying the standby hydraulic pressure when the vehicle satisfies a preset determination condition during driving.

11. The vehicle of claim 9, wherein the second controller performs control to perform the evasion steering to approach at least one of a lane, a medium barrier, or a guard rail, adjacent to the vehicle at an opposite side to a side of the broadside collision.

12. The vehicle of claim 9, wherein the second controller applies a predetermined value based on the vehicle speed to the size of the first braking power and the size of the second braking power.

13. The vehicle of claim 9, wherein the first controller determines the possibility of broadside collision in consideration of whether an object is present around the vehicle and whether a side mirror is folded.

14. The vehicle of claim 9, wherein the vehicle does not apply the standby hydraulic pressure to the hydraulic brake device at ordinary times and includes a hybrid vehicle including a single driving motor, wherein the ordinary times represent times when possibility of broadside collusion is not detected.

15. The vehicle of claim 9, further comprising an output unit configured to output information indicating that at least one of the possibility of broadside collision or the evasion steering is performed.

* * * * *